Figure 1:
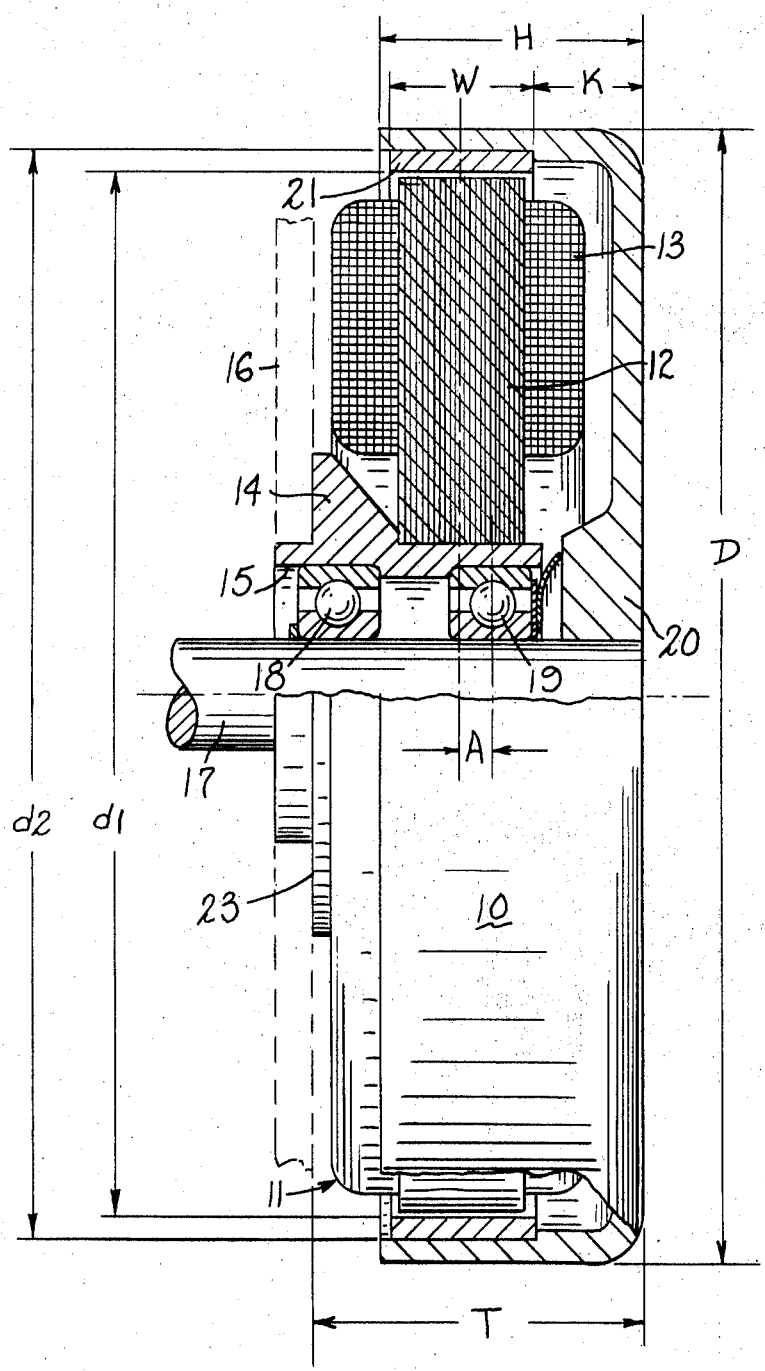

United States Patent [19]
Weaver

[11] 3,825,780
[45] July 23, 1974

[54] SYNCHRONOUS HYSTERESIS MOTOR

[75] Inventor: Preston R. Weaver, Rocky Hill, Conn.

[73] Assignee: UMC Electronics Company, North Haven, Conn.

[22] Filed: June 4, 1973

[21] Appl. No.: 366,467

Related U.S. Application Data
[63] Continuation-in-part of Ser. No. 320,061, Jan. 2, 1973, abandoned.

[52] U.S. Cl. .................................. 310/74, 310/164
[51] Int. Cl. .............................................. H02k 7/02
[58] Field of Search .......... 310/51, 90, 154, 164, 74

[56] References Cited
UNITED STATES PATENTS

| | | | |
|---|---|---|---|
| 1,977,186 | 10/1934 | Haydon | 310/164 |
| 2,140,365 | 12/1938 | Lenehan | 310/164 |
| 2,421,301 | 5/1947 | Swisher | 310/164 |
| 2,509,583 | 5/1950 | Youhouse | 310/164 |

Primary Examiner—J. D. Miller
Assistant Examiner—Robert J. Hickey
Attorney, Agent, or Firm—DeLio and Montgomery

[57] ABSTRACT

A synchronous hysteresis motor of the type including an internal stator and an overhung rotor having a hysteresis ring and rotatable with respect to the stator with a shaft rotatably mounted within the stator on two spaced apart bearing assemblies where the rear bearing assembly is spaced no more than $A = 0.225 H$ from the diametrical center of the hysteresis ring where H is the axial dimension of the rotor, and the ratio of the inside diameter of the ring to the outside diameter is at least 0.875.

2 Claims, 2 Drawing Figures

SYNCHRONOUS HYSTERESIS MOTOR

This application is a continuation-in-part of application Ser. No. 320,061 filed Jan. 2, 1973, now abandoned.

This invention relates to motors and more particularly relates to synchronous hysteresis motors.

A synchronous hysteresis motor is one in which a rotor follows a rotating electrical field in synchronism therewith. The rotor requires a hard magnetic material with a high degree of hysteresis. Thus, as the magnetic field produced by the stator rotates a magnetic pole created at the start of excitation persists on the rotor periphery opposite the stator axis. Rotation of the stator magnetic field creates a magnetic force between the pole of the stator field and that of the rotor resulting in a starting torque. As the rotor accelerates the hysteresis loss decreases increasing the power available for mechanical output at the shaft. Finally, at synchronous speed the hysteresis loss theoretically decreases to zero and the magnetic axis of the rotor, stationary on the rotor periphery, lags the stator axis by an angle proportional to the shaft load.

Such motors are quite often used in instrumentation and also for driving devices at constant speeds such as recording or video tape drives, turntables, and the like.

Hysteresis motors may rotate at synchronous average speeds and still produce objectionable flutter, that is, variation in speed during each revolution. In many applications flywheels or their equivalent cannot be used to minimize this effect. Another problem which may arise is vibration in the rotor that will be transmitted through the shaft and mount to the driven device.

The most common form of hysteresis motor is one in which the rotor is rotatably mounted between two bearings located in end bells and the stator surrounds the rotor. This produces a relatively large machine.

In applications where minimum depth of the motor with respect to length of shaft and maximum inertia are required, the rotor is the outside member and includes a ring of magnetic material within a carrying drum generally shaped in the form of a cup. In this design the radial force on the rotor resulting from the rotating magnetic field will create a vibration on the shaft related to the power source frequency. Additionally, the bearings supporting the shaft must be sufficiently spaced to hold the run out to an acceptable minimum.

The various parameters involved in the design of this type of motor have heretofore restricted efforts to minimize the depth of these motors with respect to the diameter thereof.

The present invention provides a new and improved synchronous hysteresis motor of the type having an outside or overhung rotor of minimum depth in relation to diameter, but with sufficient torque to serve its intended purpose. More specifically the present invention permits the provision of such a motor having a diameter-to-depth ratio of two-to-one and greater. The invention further provides such a motor in which transient variation in angular velocity is minimized.

Briefly stated, the invention in one form thereof comprises a motor construction of the type described in which the axial dimension of the rotor is decreased relative to the diameter thereof by location of the rotor support bearings so that vibration of the shaft is essentially eliminated and simultaneously providing a rotor ring of such dimension and positioning to minimize instantaneous variations in angular velocity of the rotor.

An object of this invention is to provide a new and improved hysteresis synchronous motor of the type described having a greater ratio of rotor diameter-to-depth than heretofore possible.

Another object of this invention is to provide a motor of the type described in which vibration of the shaft related to the power source frequency is essentially eliminated.

Further objects of this invention are to provide a motor of the type described with the required torque which has minimum instantaneous variations in angular velocity.

Figure 2:
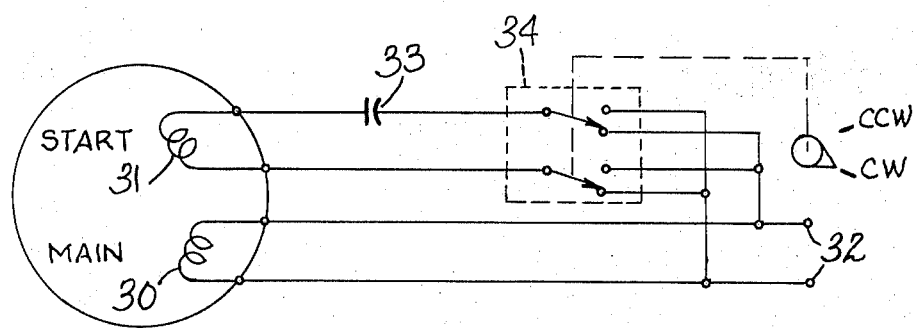

The features of the invention which are believed to be novel are set forth with particularity and distinctly claimed in the concluding portion of this application. The invention, however, both as to its operation and organization, together with further objects and advantages thereof may best be appreciated by reference to the following detailed description taken in conjunction with the drawings, in which:

FIG. 1 is an elevation of a motor, when mounted with the shaft axis in a horizontal plane, partly in half section; and FIG. 2 is a schematic diagram of the stator winding.

Referring now to the drawings, a motor 10 embodying the invention comprises a stator 11 including laminations 12, windings 13 and a central support 14 having a bore 15 axially therethrough. The windings 13 are disposed in slots in laminations 12 and define therewith the poles of the stator. Member 14 is adapted to be attached to a bracket or mount generally indicated at 16 in broken line. The stator is stationary.

A shaft 17 extends through bore 15 coaxially therewith. Shaft 17 is rotatably mounted with respect to stator 11 by means of first and second bearing assemblies 18 and 19. Each of bearing assemblies 18 and 19 comprises inner and outer races with roller or ball elements therebetween. Carried on shaft 17 is a rotor member 20 in the shape of a cup overhanging the poles defined by laminations 12 and carrying therein a rotor ring 21 of magnetic steel which spans the ends of laminations 12 in the axial direction. Ring 21 is preferably of a No. 81 cobalt magnet steel available from the Simonds Division of Wallace-Murray Corporation, Lockport, N.Y. The cup 20 is of non-magnetic material such as aluminum. Ring 21 is coaxial with shaft 17 and rotatable therewith in rotor cup 20. The rotor cup has a dimension in the axial direction H, and the dimension between the end of the ring and the back of rotor cup 20 is K. The ring 21 has an axial length W and inner and outer diameters $d_1$ and $d_2$, respectively. Rear bearing assembly 19 is positioned with respect to shaft 17 and stator 11 such that the diametrical center line thereof is offset a distance A from the diametrical center line of ring 21. The rotor has an overall diameter D, and the motor has an axial dimension of depth T over a stator mounting surface 23 and the back of the rotor.

It is the dimension A multiplied by the radial component of the magnetic force exerted on the rotor which will tend to produce vibrations in the rotor that may be transmitted to the shaft and mount to the driven device.

The bearing assembly 18 for proper support of the shaft and rotor on the stator must be spaced a distance from bearing assembly 19 resulting in at least a portion of the bearing assembly 18 residing outside of the plane of the outside edge of ring 21.

The present invention may be best expressed after consideration of certain basic parameters of this type of motor.

The torque T on the shaft is $$T = I\alpha \quad (1)$$

where
I is the moment of inertia of the entire rotor and
$\alpha$ is the angular acceleration of the rotor $$\alpha = dw/dt \quad (2)$$

where $w$ is the angular speed in radians $$dw = T/I \, dt \quad (3)$$

and in this type of rotor $$T = 11.3 \, N \, V \, A_h \quad (4)$$

where
N = number of poles of motor
V = volume of hysteresis rotor ring
$A_h$ = area enclosed by hysteresis curve of rotor material As $d_1$ approaches $d_2$, the volume of the ring V approaches zero. As I approaches $I_k$ (moment of inertia of rotor without ring), the moment of inertia of the ring $I_r$ approaches zero. The torque also approaches zero.

$$I_k + I_r = I \quad (5)$$

and $$I_r = \frac{1}{8}(d_1^2 + d_2^2)W. \quad (6)$$

where
W is total weight of the ring
and
$d_1$ and $d_2$ are the inside and outside dimensions of the rotor ring.

$$dw = [11.3 \, N \, V \, A_h/(I_k + I_r)] \, dt \quad (7)$$

The width or depth H of the rotor is effectively W + K, where W is the width of the ring and K is the dimension from the end of the ring to the end of the rotor.

I have found that motors of the type described having a diameter-to-depth ratio D/H = R of four or greater and a ratio D/T of two or greater, and having the desired operating characteristics may be provided if $$N = (d_1/d_2)/(A/H)$$

or $$N = (d_1/d_2) \cdot (H/A)$$

where
(A/H) = 0 to 0.225 and
$d_1/d_2 \geq 0.800$ and
$N \geq 3.5$ where A is the dimension between the diametrical center line of the ring, and the center of the rear bearing assembly 19 within rotor 20.

I have found that this disposition of the rear bearing assembly in relation to the diameter and depth of the rotor minimizes any vibrations related to the frequency of the power source. The vibration transmitted to the output end of the shaft can be essentially eliminated when the dimension A is maintained in the range specified.

To minimize instantaneous changes in angular velocity, I can increase the air gap between the ring 21 and the periphery of stator 11. This will decrease slot disturbances without affecting the inertia of the rotor. To compensate for the resultant decrease in torque due to increased air gap, the volume of the rotor may be increased within the limits specified. From equation (4), it will be seen that the torque is directly related to the volume of the rotor ring.

By way of example only, I have constructed a motor having dimensions of

T = 1.125 inches
D = 3.920 inches
$d_1$ = 3.510 inches
$d_1$ = 3.737 inches
W = 0.500 inch
A = 0.110 inch
H = 0.905 inch which will provide a specified output of eleven ounce - inches of torque at constant speed.

In the foregoing example, the dimension H included the slight extension of the open end of cup 20 beyond rotor ring 21 as shown in FIG. 1.

The overall depth of the motor (excluding shaft) from back of the cup to the mounting surface 23 of stator member 11 was 1.125 inches. The bearing assemblies, each having a dimension along the shaft of 0.281 inch, were spaced apart 0.385 inch between each other. The stator laminations had a thickness of 0.437 inch.

FIG. 2 exemplifies the windings of stator 11. The windings comprise one or more main windings 30, and an equal number of starting windings 31. Both windings are connected to an AC source through terminals 32. A capacitance 33 is in circuit with the start windings for phase change. A directional reversing switch 34 is also provided.

It will thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A hysteresis synchronous motor of the type comprising a stator member including a plurality of radially extending laminations having windings thereon, a bore coaxially defined in said stator member, a shaft extending through said bore coaxial with said stator member, a generally cup-shaped rotor member on said shaft and overhanging said stator and having a dimension along said shaft of H, a ring member of magnetic material carried by said cup-shaped member coaxial with and radially outwardly of said stator laminations, said ring member having an inside diameter $d_1$, an outside diameter $d_2$ and a continuous cylindrical inner surface defined on said inside diameter, said ring having a center line perpendicular to said shaft essentially corresponding with the center line of said stator laminations, first and second spaced apart bearing assemblies in said stator bore rotatably mounting said shaft, one of said bearing assemblies being positioned in said bore on the side of said ring diametrical center line toward the open end of said cup-shaped rotor, the other of said bearing assemblies having a center line which is spaced from the diametrical center line of said ring on the side thereof opposite said one bearing assembly by a distance A where $$N = (d_1/d_2)/(A/H)$$

where $N \geq 3.5$ and
$(A/H) = 0$ to $.225$ and
$d_1/d_2 \geq 0.875$.

2. The motor of claim 1 wherein said stator member has a mounting surface and a dimension from said mounting to the end of said cup-shaped rotor of T, said rotor member has an overall diameter of D, and $(D/T) > 2$.

* * * * *

PO-1050
(5/69)

UNITED STATES PATENT OFFICE
CERTIFICATE OF CORRECTION

Patent No. 3,825,780            Dated July 23, 1974

Inventor(s)    Preston R. Weaver

It is certified that error appears in the above-identified patent and that said Letters Patent are hereby corrected as shown below:

Column 4, line 34, "$d_1$" should read -- $d_2$ --

Signed and sealed this 8th day of October 1974.

(SEAL)
Attest:

McCOY M. GIBSON JR.           C. MARSHALL DANN
Attesting Officer            Commissioner of Patents